United States Patent Office 2,810,427
Patented Oct. 22, 1957

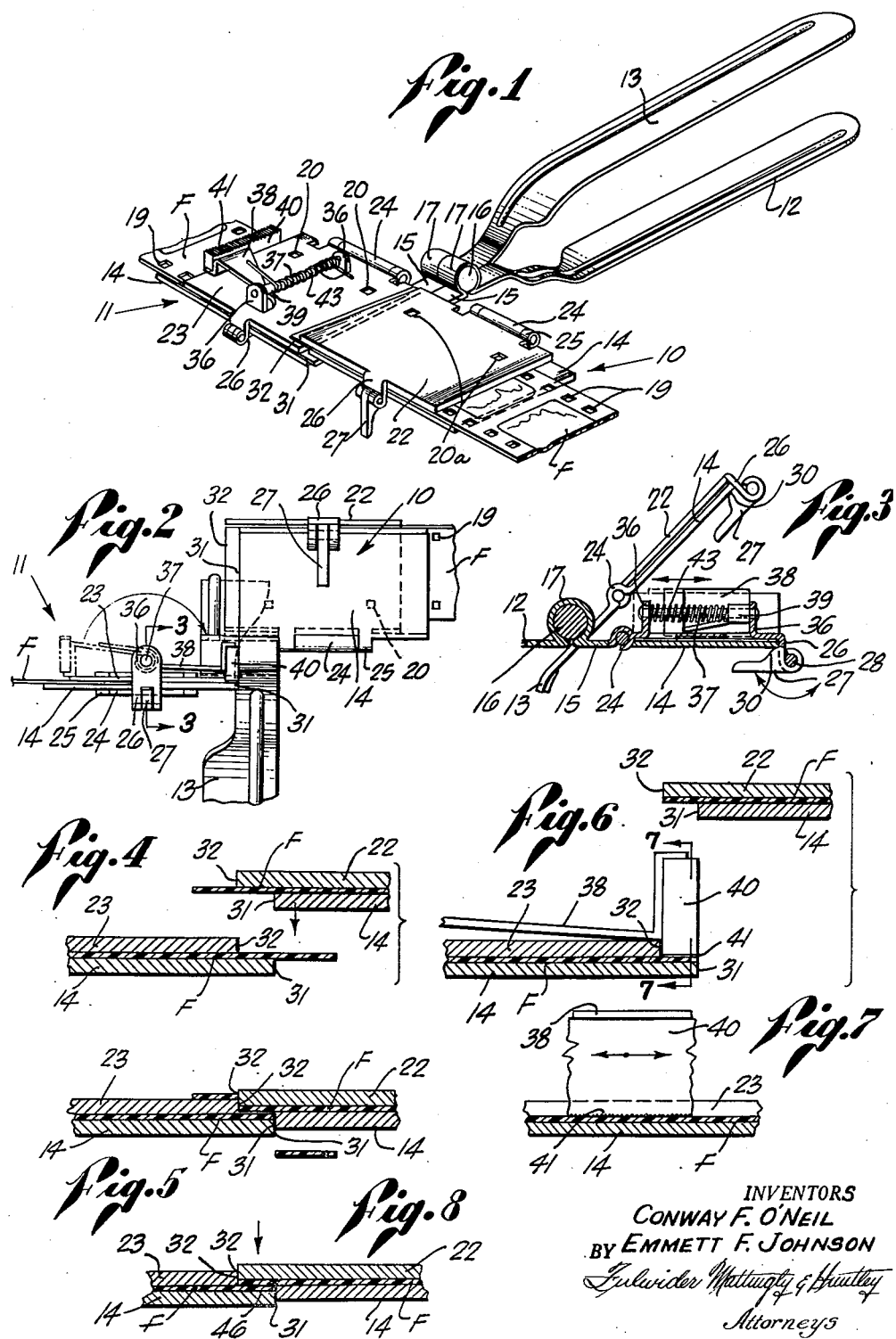

2,810,427

HAND FILM SPLICER

Conway F. O'Neil and Emmett Fred Johnson, Encino, Calif.; said O'Neil assignor to said Johnson Application August 30, 1954, Serial No. 452,936

3 Claims. (Cl. 154—42.1)

This invention relates generally to film splicers and more particularly to a hand film splicer which requires no supporting table or base and thus permits the film to be spliced quickly and easily under any conditions.

Conventional film splicing equipment provides a base mounted splicer usually mounted on a table between a pair of rewind reels. To position the film for making a splice, it is necessary to unwind considerable lead lengths of film if the film is in a projector, or to take the reels out of the projector and mount them on the rewind table. When the film is being shown or processed, such time delays are very undesirable and expensive. Also, the equipment is not readily transportable and is quite inconvenient for making quick field repairs.

An embodiment of this invention is completely contained in a small hand tool which can be used wherever the film break occurs and without the necessity for setting up any special operating conditions. The tool includes right and left film aligning and shearing assemblies mounted on a pair of pivoted handles for cooperative operation. All of the functions of aligning and clamping the film ends to trim the ends, and hold them in overlapping relationship for cementing, are performed by the aforementioned assemblies with the tool grasped conveniently in the hand of the operator. The pivotal mounting of the assemblies also permits them to be held apart by the handles so that an attached emulsion scraper can be moved into operating position with respect to the film ends after the film ends have been aligned and sheared and before cementing.

With the foregoing in mind it is a major object of this invention to provide a self-contained hand film splicing tool which is able to perform the functions of alignment, shearing, scraping, and clamping of the film ends as is necessary to complete the splice without requiring a fixed base or table.

An equally important object of the invention is to provide a hand film splicer which is quickly and easily operated and shortens the time required for making the splice.

It is also an object of the invention to provide cooperating film aligning and shearing assemblies so connected as to be easily separable for permitting an attached film scraper to be used, and to be held together in clamping position while the film ends are cemented.

A further object of the invention is to provide a film splicer having accurate and easily operated film aligning and clamping means.

Still another object of the invention is to provide a splicer of the character described which is simply and durably constructed to give good service.

These and other objects and advantages of the invention will become apparent from the following detailed description of a preferred form thereof, and from an inspection of the accompanying drawings in which:

Figure 1 is a front perspective view of the complete splicer;

Figure 2 is a front elevation showing the right and left assemblies pivotally separated;

Figure 3 is a cross section taken along the line 3—3 of Figure 2;

Figure 4 is a partial enlarged section through the film holding and shearing assemblies prior to trimming the broken ends of the film;

Figure 5 is a view similar to Figure 4, showing the assemblies closed together to trim the film end;

Figure 6 is a view similar to Figure 4 showing the assemblies separated and the scraper in operating position;

Figure 7 is a section taken along the line 7—7 of Figure 6 indicating the reciprocating path of movement of the film scraper; and Figure 8 is a view similar to Figure 4 showing the assemblies closed to hold the film ends together in overlapping position while the cement sets.

Referring now to the drawings, and particularly to Figure 1 thereof, the preferred form of splicer has right and left hand film holding and shearing assemblies 10 and 11 which are pivotally connected together and joined to a pair of rearwardly extending handles 12 and 13, respectively. Each of the assemblies 10 and 11 includes a flat rectangular table or support 14 formed with an inner rearward projection 15 joined integrally with one of the handles 12 and 13. The tables 14 lie in side-by-side relationship and are substantially coplanar when handles 12 and 13 are brought towards a closed position as shown in Figure 1. A common pivot pin 16 fits rotatably within journals 17 formed on projection 15 to pivotally connect the assemblies and extends perpendicularly to the length of handles 12 and 13 and parallel to the front and rear edges of tables 14.

Tables 14 are adapted to receive thereon opposite end portions F of the film to be spliced. End portions F are to be joined together in longitudinal and lateral alignment so as to form a continuous strip, and they are brought together from the outside ends of tables 14 so as to lie parallel to the front and rear edges of the tables. For reasons which will hereinafter be explained, both film portions F are turned with the emulsion side up and the uncoated side facing downwardly.

Sprocket holes 19 are conventionally spaced along the film portions F at regular intervals and it is necessary to maintain the regularity of the sprocket hole spacing across the splice or joint between the two film portions. In order to maintain the proper sprocket spacing and to obtain exact longitudinal and lateral alignment between film portions F, a plurality of guide teeth 20 project upwardly from the surface of each table 14 to engage in the sprocket holes 19 along one edge of both film portions F. Guide teeth 20 lie along a line parallel to front and rear edges of tables 14 and the pivot axis pin 16 so that the longitudinal axis of film portions F are correspondingly aligned. The spacing of teeth 20 is predeterminedly to maintain proper sprocket hole spacing across the joint between the two film portions F.

Above tables 14 are right and left hand clamping plates 22 and 23 respectively, which are of rectangular shape and overlie the major portion of the area of the tables. Plates 22 and 23 are pivotally connected to the rear edges of tables 14 by hinged ears 24 and 25 formed thereon so that they may be swung upwardly to permit the film portions F to be laid on tables 14. As plates 22 and 23 are lowered against tables 14 they clamp the respective film portions F tightly in place. In positioning film portions F on tables 14 the tip portions thereof are extended over the adjacent edges of the tables so that they may be trimmed off cleanly to eliminate any broken or jagged projections. At the same time, teeth 20 are engaged in appropriate sprocket holes 19. To allow plates 22 and 23 to clamp tightly against tables 14, suitably positioned apertures 20a are formed in the plates for accommodation of teeth 20.

On the front of plates 22 and 23 are depending lugs 26 which extend downwardly past tables 14 and pivotally support a latch member 27. Latch members 27 have a raised arcuate cam surface 30, as is best seen in Figure 3, which is adapted to bear frictionally against the underside of tables 14 when the latch members are pivoted downwardly. This engagement between cam surfaces 30 and tables 14 serves to pull plates 22 and 23 into tight clamping relationship with tables 14 and to lock them securely in position.

In the use of the device handles 12 and 13 tend to stand slightly apart and assemblies 10 and 11 are slightly separated. Each film portion F is positioned separately in one of the assemblies, properly aligned on the table 14, and clamped by the plate 22 or 23. As will be remembered, the ends of film portions F are overlapped inwardly on tables 14, and for reasons which will hereinafter become apparent, the film portion positioned in the right hand assembly 10 is extended over or above the portion positioned in the left hand assembly 11. The film portions F in the right and left hand assemblies may therefore be designated as the upper and lower film portions, respectively.

The adjacent edges of tables 14 are formed with sharp cornered shearing edges 31 as is best seen in Figures 1 and 4. The edges 31 cooperate to cut or trim the end of the lower film portion F as tables 14 are closed together towards a coplanar relationship. The adjacent edges of plates 22 and 23 are similarly formed with sharp cornered shearing edges 32 which lie parallel to cutting edges 31 but are spaced slightly therefrom along the longitudinal axis of the film. As illustrated, right hand plate 22 is extended so as to overlap left hand table 14 and plate 23 is cut back the same amount so that shearing edges 32 remain together. Edges 32 are adapted to trim the end of upper film portion F as plates 22 and 23 are brought together towards a coplanar relationship.

The action of shearing edges 31 and 32 is illustrated in Figures 4 and 5. As handles 12 and 13 are squeezed together, tables 14 close together and plates 22 and 23 also close together. Movement from the position shown in Figure 4 to that shown in Figure 5 causes edges 31 to cut off the end of the lower film portion F while the end of the upper film portion is simultaneously cut by the edges 32. The trimmed waste falls free of the device and film portions F are left properly trimmed and clamped in overlapping relationship to form a lap joint suitable for a film splice.

As will be remembered, film portions F are clamped emulsion side up, and in order to form a good bond between them it is necessary to remove the emulsion from the face of the lower film portion in the area overlapped by the upper film portion. To this end a film scraper is mounted on the left hand assembly 11. A pair of spaced brackets 36 project upwardly from plate 23 and support a shaft 37 extending parallel to plate edge 32 and spaced outwardly therefrom. Mounted on shaft 37 is an arm 38 having an inner collar 39 which is rotatable on shaft 37 and is also slidable axially along the shaft. Attached to the outer end of arm 38 is a rectangular scraping block 40 having a sharp ridged or serrated surface 41 of a width substantially the same width as that of the upwardly exposed area of the lower film portion F clamped by plate 23.

Normally block 40 is held in a remote position spaced from film portion F as is seen in Figure 1, with scraping surface 41 turned upwardly and in inoperative condition. By pivotally swinging arm 38 about shaft 37 as is indicated in Figure 2, block 40 rotates in a clockwise direction to turn scraping surface 41 downwardly and bring it into position directly over the exposed upper surface of lower film portion F. The relationship of block 40 to the surface of film portion F when so positioned is best seen in Figures 6 and 7.

In order to move block 40 to operating position, it is necessary to separate assemblies 10 and 11 so that plate 22 is well clear of the surface of lower film portion F. Separation of handles 12 and 13 causes assemblies 10 and 11 to separate as is best seen in Figures 2 and 3. It can be appreciated that this can be accomplished very easily by a simple hand movement and is one of the important features of the invention.

After block 40 is in operating position, it is moved to and fro across the surface of lower film portion F to remove the emulsion from the surface thereof as indicated in Figure 7. When the emulsion has been completely removed, block 40 is lifted out of the way and returned back to its remote position. In order to return block 40 to its remote position and to hold it in that position, a coil spring 43 is wound around shaft 37 and has one end bearing against arm 38 and the other against plate 23. Spring 43 urges arm 38 to rotate in a counter-clockwise direction but is yieldable to allow movement of the arm to the operating position. It should also be noted that spring 43 is confined between arm collar 39 and the opposed bracket 36. Thus, spring 43 also serves to urge collar 39 forwardly on shaft 37 but is yieldable to allow the reciprocating scraping movement of block 40 as previously described.

The final step in completing the splice is to bond or cement together the overlapping surfaces of the film portions F with a suitable adhesive. In order to secure a good bond, it is necessary to clamp the two film portions F tightly together while the cement is setting. A layer of cement or adhesive 46 in bonding position is indicated in Figure 8. During the setting of the adhesive, hand pressure is maintained on handles 12 and 13 to close them together and firmly clamp film portions F. As soon as the bond is completed, plates 22 and 23 are released from clamping position and the film is joined in a continuous strip.

It may now be fully appreciated that the construction of the splicer is such as to make it usable under any conditions and without requiring any special alignment or preparation of the film. While we have described in some detail the construction and operation of the device, it will be appreciated that the design may be modified without departing from the principles of the invention. Therefore, we do not wish to be restricted except as defined in the appended claims.

We claim:

1. A film splicer comprising: a pair of aligning and clamping assemblies each having a lower flat supporting table and an upper flat clamping plate, said plate being pivotally connected to said table along its rear edge for removably clamping a film end portion therebetween, said assemblies being pivotally connected together on an axis rearwardly of the plate pivot axis and parallel to the longitudinal axis of the film for holding said film portions in overlapping and joining relationship, said tables having adjacent cooperating shearing edges extending perpendicular to said film axis to trim the ends of the lower film portion and said plates having parallel cooperating shearing edges spaced from said table edges to trim the ends of the upper film portion along an edge overlapping the edge of said lower film portion; upwardly projecting guide teeth mounted on said tables and extending longitudinally therealong for engaging in the sprocket holes of said film for registering said film end portions with said shearing edges; and a pair of handles formed integrally with said tables and extending rearwardly beyond said table pivot axis for manually separating and holding said assemblies together.

2. A film splicer comprising: a pair of aligning and clamping assemblies each having a lower flat supporting table and an upper flat clamping plate, said plate being pivotally connected to said table along its rear edge for removably clamping a film end portion therebetween, said assemblies being pivotally connected together on an axis rearwardly of the plate pivot axis and parallel to the longitudinal axis of the film for holding said film portions in overlapping end joining relationship, said tables having adjacent cooperating shearing edges extending perpendicular to said film axis to trim the ends of the lower film portion and said plates having parallel cooperating shearing edges spaced from said table edges to trim the ends of the upper film portion along an edge overlapping the edge of said lower film portion; upwardly projecting guide teeth mounted on said tables and extending longitudinally therealong for engaging in the sprocket holes of said film for registering said film end portions with said shearing edges; a latch mounted on the front edge of each of said plates and having a cam portion adapted to be moved pivotally to engage beneath the table to frictionally clamp said plate tightly against said table; and a pair of handles formed integrally with said tables and extending rearwardly beyond said table pivot axis for manually separating and holding said assemblies together.

3. A film splicer comprising: a pair of aligning and clamping assemblies each having a lower flat supporting table and an upper flat clamping plate, said plate being pivotally connected to said table along its rear edge for removably clamping a film end portion therebetween, said assemblies being pivotally connected together on an axis rearwardly of the plate pivot axis and parallel to the longitudinal axis of the film for holding said film portions in overlapping end joining relationship, said tables having adjacent cooperating shearing edges extending perpendicular to said film axis to trim the ends of the lower film portion and said plates having parallel cooperating shearing edges spaced from said table edges to trim the ends of the lower film portion and said plates having parallel cooperating shearing edges spaced from said table edges to trim the ends of the upper film portion along an edge overlapping the edge of said lower film portion; upwardly projecting guide teeth mounted on said tables and extending longitudinally therealong for engaging in the sprocket holes of said film for registering said film end portions with said shearing edges; a latch mounted on the front edge of each of said plates and having a cam portion adapted to be moved pivotally to engage beneath the table to frictionally clamp said plate tightly against said table; a scraper mounted on the assembly holding said lower film portion for pivotal movement from a remote position to a position in overlapping relationship with the exposed upper surface of the lower film portion when said assemblies are pivotally separated, said scraper being supported for sliding movement transversely of said film; spring means urging said scraper towards said remote position; and a pair of handles formed integrally with said tables and extending rearwardly beyond said table pivot axis for manually separating and holding said assemblies together.

References Cited in the file of this patent

UNITED STATES PATENTS

| | | |
|---|---|---|
| 2,250,194 | Gavin | July 22, 1941 |
| 2,401,991 | Walton et al. | June 11, 1946 |
| 2,457,995 | Frankel | Jan. 4, 1949 |
| 2,611,723 | Aboltin | Sept. 23, 1952 |
| 2,611,724 | Wittenberg | Sept. 23, 1952 |